US008895834B1

(12) United States Patent
Nachamkin (10) Patent No.: US 8,895,834 B1
(45) Date of Patent: Nov. 25, 2014

(54) SOLAR TRACKER ASSEMBLY

(76) Inventor: Jack Nachamkin, Glen Mills, PA (US)

(\*) Notice: Subject to any disclaimer, the term of this patent is extended or adjusted under 35 U.S.C. 154(b) by 908 days.

(21) Appl. No.: 12/932,574

(22) Filed: Mar. 1, 2011

(51) Int. Cl.
*H01L 31/042* (2014.01)
*H02N 6/00* (2006.01)
*F24J 2/38* (2014.01)

(52) U.S. Cl.
USPC ............................ 136/244; 126/600; 126/605

(58) Field of Classification Search
CPC .................................. F24J 2/542; Y02E 10/47
USPC .................................... 136/244; 126/600, 605
See application file for complete search history.

(56) References Cited

U.S. PATENT DOCUMENTS

| | | | |
|---|---|---|---|
| 4,847,546 A * | 7/1989 | Bobier et al. | 320/102 |
| 5,604,430 A * | 2/1997 | Decker et al. | 323/275 |
| 6,058,930 A | 5/2000 | Shingleton | |
| 7,430,077 B2 * | 9/2008 | Briee et al. | 359/591 |
| 2010/0139645 A1 * | 6/2010 | Whipple et al. | 126/576 |
| 2010/0180883 A1 * | 7/2010 | Oosting | 126/574 |

\* cited by examiner

*Primary Examiner* — Tamir Ayad
(74) *Attorney, Agent, or Firm* — Chris Papageorge (57) ABSTRACT

An assembly is disclosed for adjusting the position of a solar array or device to enable it to maintain a desired solar energy reception throughout each day's operation of the assembly. Solar panels are mounted on a first axle and a second axle, and the axles are mutually orthogonal. The assembly also includes a first motor for rotating the array and the panels relative to the first axle in a direction providing azimuth angle position adjustment and a second motor for rotating the array and the panels and the second axle in a direction providing elevation angle position adjustment. The motors are electrically connected to and powered by their respective solar panels. Divider circuits control the current fed into the motors to control the rotational movement in order to control the azimuth and elevation orientation of the panels and also control the orientation of the array so that it continually faces the sun throughout the diurnal operation of the assembly and so that it maintains the desired degree of solar energy reception throughout the day. The orientation of one of the panels enables it to reposition the assembly for operation at each successive sunrise.

20 Claims, 8 Drawing Sheets

SOLAR TRACKER ASSEMBLY

CROSS REFERENCES TO RELATED APPLICATIONS (not applicable)

STATEMENT REGARDING FEDERALLY SPONSORED RESEARCH OR DEVELOPMENT (not applicable)

NAMES OF PARTIES TO A JOINT RESEARCH AGREEMENT (not applicable)

INCORPORATION BY REFERENCE OF MATERIAL SUBMITTED ON COMPACT DISC (not applicable)

BACKGROUND OF THE INVENTION

1) Field of the Invention

The invention relates to systems used for enhancing the solar energy received by a solar array and, more particularly, to such systems which maintain the solar array in its desired position of facing the sun throughout diurnal operation of the system using the electrical power generated by a solar panel.

2) Description of the Related Art Including Information Disclosed Under 37 CFR 1.97 and 1.98

Worldwide energy demands have been steadily increasing as more people in more countries use energy consuming technologies in their daily lives. Fossil fuel sources of energy have therefore been increasing in cost as a result of this increasing demand. However, many alternatives to non-renewable energy sources such as nuclear energy and wind power devices have not been able to meet this increasing demand with clean, safe and non-polluting methods of utilization.

In the current field of exploiting renewable energy sources, there is a great increase worldwide in the use of solar energy facilities that use photovoltaic cells. Photovoltaic cells used for converting sunlight into electrical energy are placed in arrays and used for a variety of purposes. They are used as utility interactive power systems, as power supplies for remote or unmanned sites, as cellular phone switch site power supplies and as housing complex power supplies. Such arrays are able to produce from several kilowatts to over a hundred kilowatts of energy and can be installed wherever there is a reasonably flat area with exposure to the sun for significant portions of the day.

Companies producing and designing solar panels are receiving considerable funding from government sources in order to produce more efficient and cheaper designs. It is thus expected that the use of solar panels will become more widespread in the near future as the funding yields the anticipated improvements in solar panel designs. Many of the new designs are expected to be in the chemistry and structural makeup of the photovoltaic cells which are the constituents of the solar panels.

The efficiency and output of solar panels have been increased by panel clustering into the smallest possible space by forming large surfaces at a single level. But, this solution hinders panel cooling, reducing their yield due to the temperature increase at a ratio of 0.5% per degree Centigrade. This clustering is further limited due to panel expansion since the support structures are rigid and occasionally surrounded by a frame enclosing them, generating stresses between panels due to nighttime and daytime temperature differences. Such designs also have the important shortcoming of inherent structural instability as a result of asymmetrical static loads which has limited their use. Consequently, other ways of improving the performance of the solar panels have been developed which focus on maximizing the sunlight received by the photovoltaic cells.

A general principal is that the power generated by a solar panel depends strongly on the angle between the direction of propagation of solar rays irradiating the panel and a normal to the surface of the panel. Various forms of solar trackers have been developed for use with arrays of panels of photovoltaic cells to optimize the orientation of the solar panels so that it is normal to the direction of propagation of the solar rays throughout the day thereby increasing the concentration of light energy on the panels.

One type of conventional tracker used for solar power panels and solar collectors to improve their efficiency mounts the collector on a north-south axis and rotates it from east to west to follow the sun's apparent movement from sunrise to sunset. Typically, such systems include a pair of photovoltaic cells mounted on the solar collector or panel one cell of which views the eastern quadrant (90 degrees) of the horizon (when the collector and the cell are positioned in a horizontal plane) and the other cell of which views the western quadrant of the horizon. A difference in outputs between the cells indicates an error point at the sun, and thus the outputs of the cells are used to correctly reposition the solar collector. However, such systems are error prone. The presence of clouds and especially a single bright cloud can draw a photocell away from pointing at the sun and cause a drive system to miss-position a collector.

Another type of solar tracker system has photovoltaic panels configured in rows supported on a torque tube that serves as an axis. A tracker drive system rotates or rocks the rows to keep the panels as orthogonally oriented (relative to the sun) as possible. Typically, the rows are arranged with their axes disposed in a north-south direction and the trackers gradually rotate the rows of panels throughout the day from an east-facing direction in the morning to a west-facing direction in the afternoon. Subsequently, the rows of panels are manually brought back to the east-facing orientation for the next day.

A solar collector arrangement of this type is disclosed in U.S. Pat. No. 6,058,930 to Shingleton. In the Shingleton system, a tracker is associated with at least one row of panels. A north-south oriented torsion tube defines a north-south axis and an array of flat rectangular solar are attached in a generally balanced fashion on opposite sides of the torsion tube. The system uses at least one pier, and the footing of the pier is supported in the earth. A pivot member is affixed to the pier above its footing and the torsion tube is journalled in this pivot member. This permits the array of solar panels to be rotated on the north-south axis to follow the motion of the sun relative to the earth. The Shingleton arrangement is designed to enable the system to tolerate the stresses and loads that are imposed on the components of pier mounted solar array systems. However, an important disadvantage of such arrangements is that since many such conventional pier mounted designs do not track the apparent movement of the sun solar energy collection is not optimum and the panels have to be made larger than otherwise would be deemed necessary in order to improve upon the solar energy received. This basic design thus requires that it be made large which imposes heavy loads on the components thereof rendering them more failure prone than smaller system designs.

The most efficient trackers, for absorbing maximum sunlight in a given day, have been multiple axis trackers, which rotate about more than one axis so as to follow both the azimuth variation (progression of the sun's bearing angle i.e., east to south to west), and the sun's change in elevation angle from the horizon. These types of trackers can provide annual energy output improvements of 30%. These types of trackers are particularly beneficial to concentrating solar collectors. In such concentrating solar collectors, the received solar radiation is converted into a concentrated radiation beam before it is directed to the solar cells, and such designs are very sensitive to the angle of incidence of the solar radiation. Of the two solar tracker axes, azimuth orientation and elevation (or tilt) orientation, the first is more important since it provides a substantially greater energy production gain. In addition, the azimuth tracking axis can furthermore be easily carried out since it is exclusively a time function and therefore uniform throughout the year. In contrast, the tilt axis varies according to both the elevation changes as the sun moves during the day and the seasonal changes due to the tilt of the earth's orbit and its tracking is therefore more complex. Consequently, most large trackers presently installed provide only single axis tracking, and conventional multi axis systems presently installed generally have an inordinate degree of complexity. Their complexity presents numerous potential malfunction problems and inaccuracies. Reversing motors and computer driven reversing mechanisms as utilized in some of these systems also add to the cost. Many such systems also utilize very sophisticated and high precision components that must be shielded from environmental elements to which exposed in order to provide a reasonable degree of longevity. The required shielding structures and subsystems add to the cost and also add to the weight of the system necessitating structural reinforcements or higher strength support structures along with higher power motors.

Due to the complexity and structural instability problems associated with conventional solar tracking systems in addition to their increased cost, solar panel installations are typically of the fixed position type. They are fixed in a position in which the panels are oriented toward the south, depending on whether the installations are located north or south of the equator. The angle of inclination depends on the latitude of the installation site. But for such solar panel installations that are fixed in position, the exploitation of the solar radiation received is not as high as it otherwise could be since the direction of the perpendicular to the solar panel coincides rarely if ever with the direction of the solar rays on an annual basis. Consequently, the annual energy output of such solar installations is much less than optimal.

What is therefore needed is a structurally simple yet accurate system for tracking the sun's apparent diurnal movement. What is also needed is such a system which is capable of maximizing the solar energy gathering efficiency of the system for which the tracking is provided.

BRIEF SUMMARY OF THE INVENTION

It is a principal object of the present invention to provide a solar tracker that will continuously and automatically track the sun's apparent diurnal movement.

It is another object of the invention to provide a solar tracker that will automatically reposition the tracker after the end of diurnal operations thereof for optimal reception of the solar rays at the beginning of successive diurnal operations.

It is an object of the present invention to provide a simplified solar tracker that is relatively inexpensive and which does not require a high degree of maintenance.

It is an object of the present invention to provide a solar tracker that is simple in structure and function so that it has a high degree of reliability.

It is an object of the present invention to provide a solar tracker that has relatively few components so that there are few components that can break down or malfunction thereby providing enhanced reliability.

It is an object of the present invention to provide a solar tracker that maximizes the duration of solar energy reception of its diurnal operation.

It is an object of the present invention to provide a solar tracker that is capable of providing a high degree of accuracy.

It is an object of the present invention to provide a solar tracker having a separate drive mechanism and a separate axle for each degree of rotational movement for improved accuracy.

It is also an object of the present invention to provide a solar tracker having a separate control subsystem for each degree of rotational movement for improved accuracy.

It is an object of the present invention to provide a solar tracker that may be used for various types of solar energy collection applications.

It is an object of the present invention to provide a solar tracker for a solar array that may be any suitable desired shape and size.

It is yet another object of the present invention to provide a solar tracker assembly capable of operation with substantially uniform tracking sensitivity throughout the year.

Basically, the assembly of the present invention utilizes motors powered by solar panels and controlled by other assembly components to track the sun's apparent diurnal movement. The assembly of the present invention thereby maintains the solar power array as well as any other suitable solar power panel, array or collector for which its tracking function may be used at a desired optimal orientation relative to the solar rays. The solar power array is independent of the solar panel or panels driving the axles. The power panel might therefore be utilized to convert solar energy to generate electricity and/or heat. The assembly utilizes driver solar panels that activate the motors that mechanically rotate the entire system.

In operation, when sunlight illuminates a driver solar panel of the tracker, the solar energy is converted to electrical energy which is transmitted to the motor for activation thereof. The motor will rotate the driver solar panel as long as the driver panel is receiving sufficient sunlight to match or exceed the electrical power requirement of the motor. When the solar energy converted into electrical power falls below the threshold power requirement of the motor, the motor stops and thereby the rotation of the driver panel stops. The driver panel thus powers the motor so that it rotates the driver panel to the point at which it is positioned/oriented relative to the solar rays such that the angle of inclination of the solar rays incident thereon yields the desired optimal aggregate solar radiation received by the driver panel, and beyond this point the motor stops The driver panel thus is stopped at an orientation where it does not receive the desired aggregate degree of solar radiation and in effect the driver panel is moved to the point where it is slightly ahead of the earth's rotation. Subsequently, the earth's rotation will "catch up" with the driver panel so that it approaches receiving the desired optimal solar radiation at which point the motor starts up and rotates the driver panel but again stops when it goes beyond the point at which the driver panel receives sufficient radiation to power the motor or to turn on activation output controls of associated control components and circuitry. Thus, the start and stop process of the motor continually repositions the driver panel so that the angle of incidence of the solar radiation on its face is ninety degrees, or that deemed optimal. In effect, the assembly of the invention follows the sun by avoiding it.

It is a crucial feature of the invention that the panel orientation control positions the panel so that it does not exceed a certain level of solar energy output. However, the power panel, which is generally what the tracker is intended to provide tracking for, need not be at the same orientation and thereby at the same degree of inclination relative to the solar rays as the solar driver (or tracker) panel. Instead, the power panel may be positioned at an angle relative to the solar panel such that the power panel is ahead of the tracker panel with regard to the sun's diurnal movement. Thus, the power panel may, for example, be positioned so that it is continually receiving the optimal solar energy while the solar tracker panel is receiving less than that optimal amount of energy. Moreover, the power panel may be angularly positioned relative to the solar panel at such a select angle that it receives any desired degree of solar energy relative to the maximal amount that can be received when the solar rays are at a normal angle of incidence on the power panel.

In order to ensure that the motor is started and stopped at the precise solar panel orientations which provide the desired energy output, a passive zener circuit is provided to prevent an "overshoot" of the optimal orientation and other spurious motion. The output of the zener circuit can be directly injected into the driving motor. This output can also be directed to a relay that can control the current flow from the driver panel to the motor. The control circuitry and optional relay operate to start the motor when the electrical voltage or current output from the solar panel rises to a predetermined value and stop the motor when it drops below a predetermined value. These components narrow the range of solar energy received and thereafter converted to electrical energy and utilized to power the motor. Consequently, they prevent the panel from being rotated too far beyond the optimal orientation position and additionally can be adjusted to prevent the motor from stopping too far below the optimal orientation position. These components thus effectively function to keep the panel at a desired optimal orientation (and, more specifically, within a desired range of orientation parameters) relative to the sun throughout the day.

The solar panel is mounted on a rotatable shaft or axle which is connected to the motor. Preferably, the motor is connected to a base shaft, and the base shaft is affixed to a base structure or ground such that the base shaft does not rotate relative to the base structure or ground. But, the motor rotates relative to the base shaft and thereby the base structure or ground. The base shaft can be vertically upright with the azimuth adjustment primary solar driver panel and motor positioned and affixed so as to enable rotation of the motor relative to the base shaft and thereby the azimuth primary driver panel in an east-west direction so that the azimuth primary driver panel tracks the apparent east-west movement of the sun. This azimuth tracking substantially provided by the azimuth adjustment primary solar driver panel enhances the solar energy collecting capability of the driver panels as well as a solar power array or any other structure which the assembly of the invention may be used for.

Since the angle of incidence of the solar rays on the solar panel varies in accordance with the tilt movement of the earth and the daily motion of the sun in the sky from dawn to sunset, second driver (or tracker) panels (more specifically a second pair of driver panels) and motor combination are provided to correct for this type of movement. For this set of components, the rotating shaft or axle is oriented in an east-west direction and can thereby control the elevation of the entire system. The rotating axle is orthogonal to the base shaft or axle so that they, in combination, provide two degrees of movement. Each of the second driver panels and second motor utilize a second control circuit and a second relay which function the same as the first control circuit and first relay. These second components enable elevation angle position adjustment of the panels in order to correct for seasonal changes in the tilt position of the earth. Additionally, the second driver panels as well as the first driver panels are rigidly connected to the rotatable axle. The rotatable axle is rigidly connected to the second motor so that the second motor and rotatable axle rotate both pairs of tracker panels simultaneously. Also, the first motor and base shaft (or axle) rotate the second motor as well as both pairs of panels simultaneously. The elevation adjustment panels and motor combination also correct for changes during the day in the apparent position of the sun relative to its midday position when it is at its highest apparent position in the sky. The initial positioning of the second axle (as well as the entire tracker) need not be set relative to the earth axis. Tilt thus need not be accurately set because the elevation components position the axle relative to the sun's apparent position and thereby relative to the earth axis as accurately as may be desired.

At the end of the day's operation the assembly is placed in position for the next day's operation by means of incorporation of an azimuth adjustment return panel. Thus, the assembly components used to provide azimuth position adjustment (or correction) incorporate essentially a pair of panels placed back to back with the panel faces i.e., the surfaces having solar cells to receive the solar rays, at opposite sides thereof. The same azimuth motor can be employed to rotate the rotatable axle and panels from the sunset position to the sunrise position. In effect there are two driver panels using the same motor but at different times of the day. The angle between the back to back panels is selected so that at the end of the day's operation, one of the pair that has not been illuminated during that day's operation is positioned for reception of solar rays at sunrise at the desired optimal angle of incidence. Thus, one of the pair that was the "back" (or return) panel during the particular day's operation is positioned facing the direction of the sun at sunrise for reception of solar rays at the succeeding sunrise at the desired optimal angle of incidence. Thus, the motors rotate the panels to follow the sun's apparent position in the sky until sunset. Due to the angular positioning of the panels, during operation one of the panels is always shading the other.

At sunrise the (return) panel facing east rotates the axles in the opposite rotational direction of the motion during the day. This is achieved by wiring the return panel to the azimuth motor in opposite polarity to the wiring for daylight operation. This electrical arrangement is made possible because of the blocking ability of the zener diodes. The sunrise-to-sunset connection of the panels to the motor and the return connection of the back (return) panel are connected to the same terminals of the azimuth motor with no adverse effect electrically. A little after sunrise, the daytime (primary) panel's voltage will take control of the motor's rotation. The reason for the reverse rotational motion is to avoid wrapping wires around axles and other components. Alternatively, sliding brush type contacts can be used to deliver power to the motors. However, if such sliding contacts are used, the motion of the azimuth motor relative to the base shaft can be made in the same direction throughout successive days' operation and not produce wrapping the wires around the axles with 360 degree motion. It should be noted that the elevation adjustment (second) panels at sunset are nearly ideally positioned by mirror symmetry for initial operation at sunrise if the azimuthal position of the panels is set via panel rotation so that the panel faces east at sunrise. This feature is provided by the integral construction of the elevation panels consisting of a pair of panels facing in the same general direction.

The faces of each pair of azimuth adjustment panels are facing outwardly and away from each other so that only one of the panel faces can be properly illuminated. Thus, the invention has the important feature that the daily tracking is provided without the necessity of either manual reset, or mechanical or electronic reset at the end of each day. It instead provides fully automatic operation day after day. The tracker invention also has the advantageous features that there are a minimal number of moving parts and a minimal number of components which provide reliability as well as weight savings. These features also enable the entire structural surface area of the assembly to be smaller thereby minimizing vulnerability of the entire installation to wind forces that compromise the practicality of conventional trackers.

DETAILED DESCRIPTION OF THE INVENTION

Figure 1:
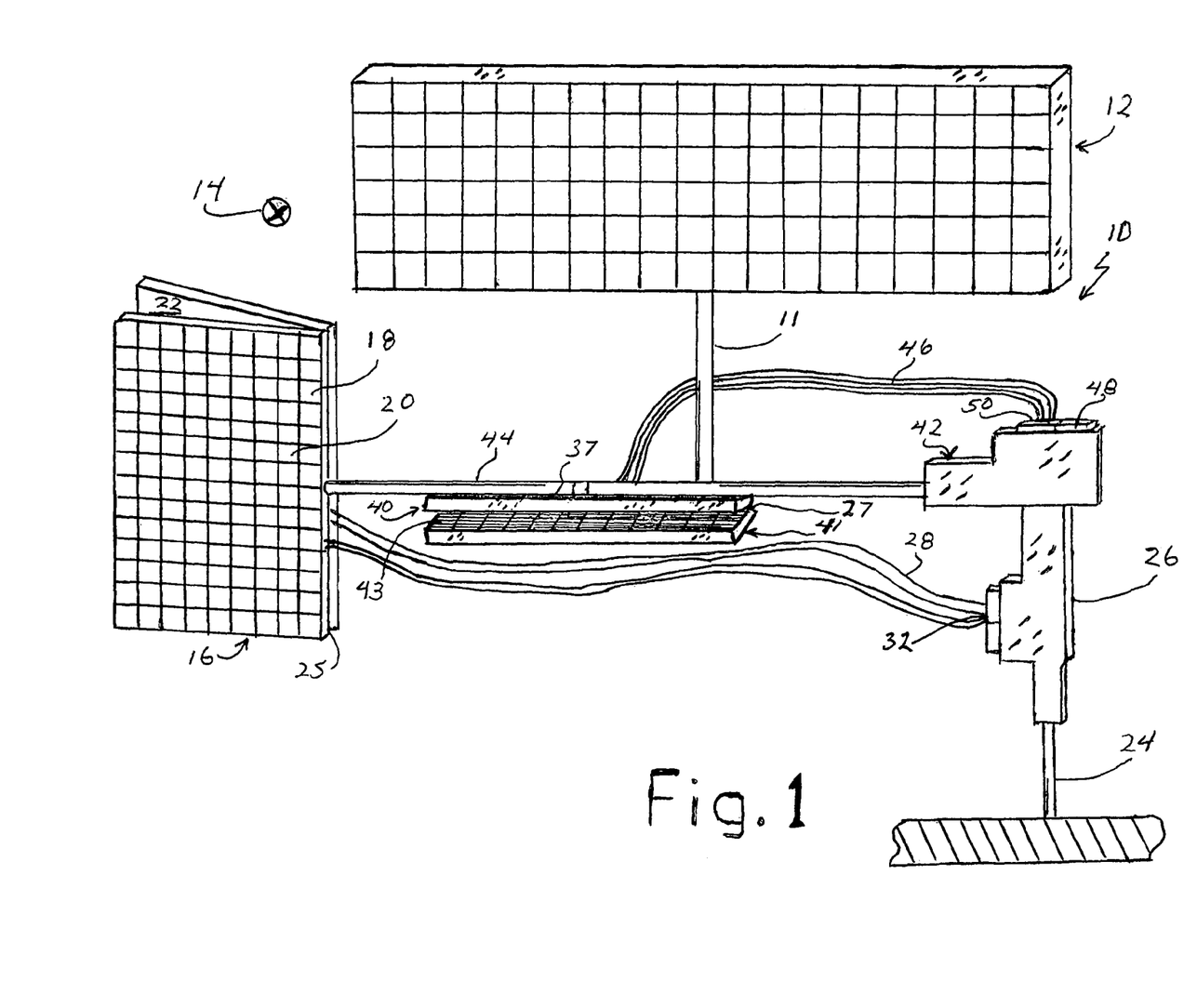
FIG. 1 is a perspective view of a first embodiment of the solar tracker assembly shown connected to a solar array which the assembly is designed to position in accordance with its tracking of the sun's apparent diurnal movement across the sky.
Figure 2:
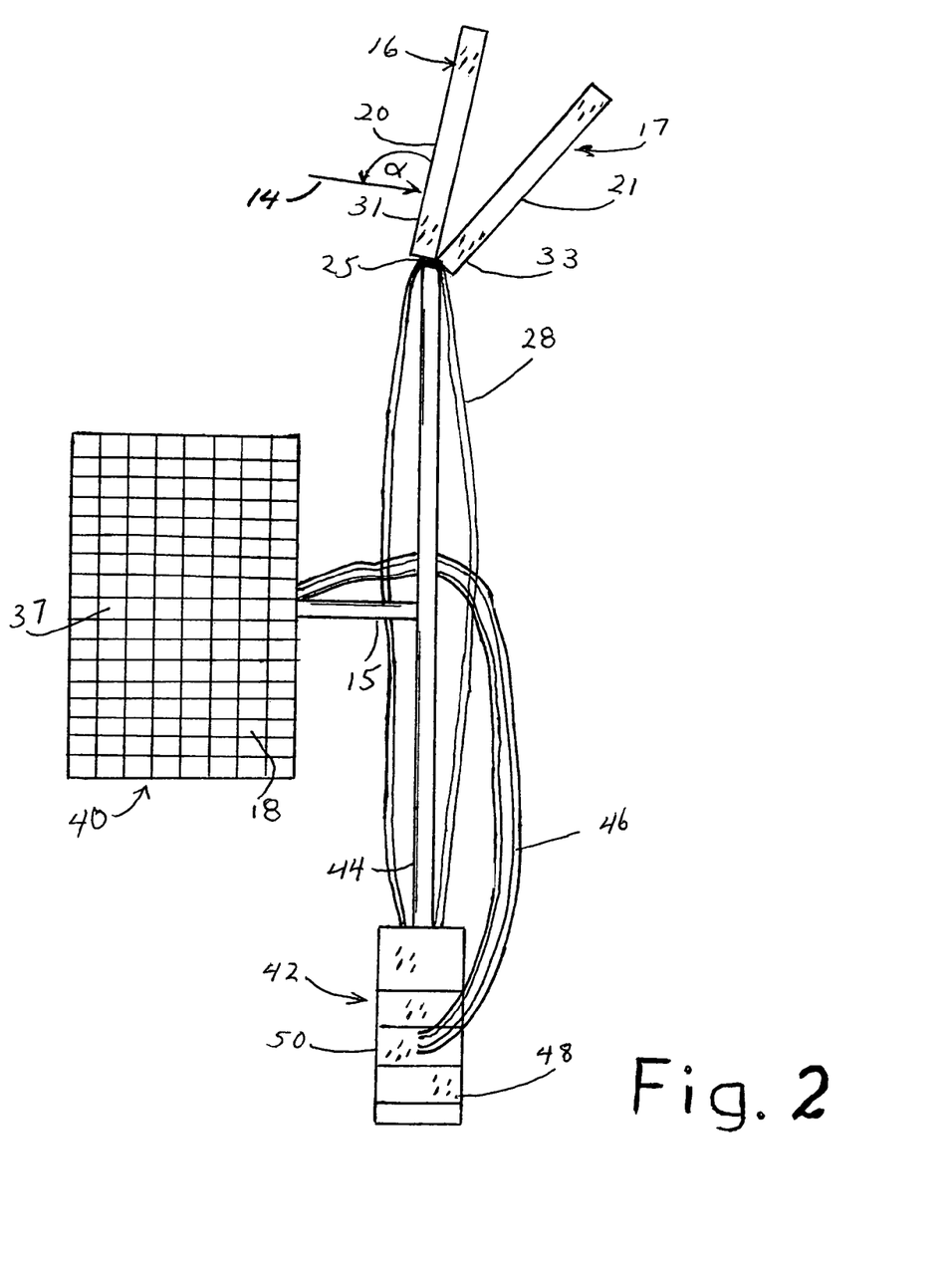
FIG. 2 is a top diagrammatic view of the first embodiment of the solar tracker assembly showing the first embodiment in more detail and also showing the return components thereof.

Referring to the drawings, FIG. 1 shows the solar tracker assembly of the invention generally designated by the numeral 10. FIGS. 1 and 2 also show the assembly 10 connected to and being used to position a solar power panel array 12 so that the power array 12 is facing the sun throughout the day and so that the solar rays 14 illuminating the solar array 12 are at a desired angle of incidence to provide a desired concentration of solar energy on the solar array 12 and thereby enhance solar ray reception thereof.

As shown in FIGS. 1 and 2, the assembly 10 of the invention includes an azimuth adjustment primary (or first) driver solar panel 16 consisting of a multiplicity of interconnected solar photovoltaic cells 18. The driver panel is shown as rectangular but may be of any other suitable shape. The solar panel 16 has a front side or face 20 and a back side 22. The face 20 is designed for reception of solar energy via solar rays 14 incident thereon.

The driver panel 16 is rigidly connected to a second rotatable shaft or axle 44. A first electric motor 26 is rotatably connected to a first base shaft or axle 24 which in turn is rigidly connected to a secure base or foundational structure so that the axle 24 is rigid relative thereto. The motor 26 is electrically connected to the solar panel 16 via first electric wires or first set of electrical wires 28 so that the panel 16 can provide electric power to the motor 26.

In operation, the driver panel 16 converts solar energy of the solar rays 14 irradiating it to electrical current which it feeds to the motor 26 causing the motor 26 to rotate itself relative to the axle 24 and thereby rotate the panel 16 relative to the base structure. The axle 24 and motor 26 are oriented to rotate to follow the azimuth of the sun. The axle 24 may be set so that it is generally parallel to the earth's axis (not shown). The motor 26 is set up and connected to the axle 24 such that it rotates the motor 26 and axle 44 and panel 16 in an east to west direction. Thus, the motor 26 rotates itself and the axles 44 and panel 16 away from and ahead of the sun's apparent movement relative to the earth (and the assembly 10). The motor 26 continues to rotate the panel 16 until it no longer receives sufficient electrical energy from the panel 16 to activate or actuate it. The motor 26 and the axle 44 and panel 16 therefore stop with the driver panel 16 at a position where the angle of incidence of solar radiation irradiating it is less than optimal. This angle of incidence a where the driver panel 16 as well as the power panel 12 are stopped may be slightly less than, or substantially less than, perpendicular depending on the particular requirements of the solar power panel or cooker 12 or the application for which the tracker assembly 10 is being utilized. FIG. 2 illustrates the angle of incidence a formed by the irradiation of the panel 16 by solar ray 14, and it is representative of that formed by irradiation of other panels as well. The rotational movement of the solar panel 16 relative to and on said first axle 24 essentially functions to allow adjustment of azimuth angle orientation with reference to earth spherical coordinates of the solar panel 16. This achieves the objective of providing position adjustment of the solar panel 16 such that it corresponds to rotational movement of the earth relative to the sun Additionally, this rotation function thus provides azimuth angle adjustment or tracking for the azimuth panel 16 as well as the power panel 12 and other associated structures. The solar power panel 12 is preferably rigidly connected to the axle 44 via a connector 11 so that rotation of the panel 16 also results in rotation of the power panel 12.

Since the motor 26 is preferably a conventional electric motor, it characteristically may be able to rotate relative to the axle 24 and rotate the axle 44 and azimuth panel 16 throughout a broad range of electrical energy parameters. It is therefore desirable to narrow the range of voltage or amperage fed into the motor 26 and in this manner accurately control the operation of the motor 26. To accomplish this goal, the assembly 10 incorporates a relay 30 and an azimuth electrical output control means 32. The electrical output control means 32 preferably controls the voltage from the solar panel 16 being fed into the motor 26 and, more specifically, controls the voltage from the solar panel 16 being fed into the relay 30. The energizing voltage of the relay is selected so that it is within the energy output range of the panel and the energy requirements of the motor 26. The electrical output control means 32 feeds electrical current to the relay at a level high enough to energize the relay when the electrical output from the panel 16 is at a predetermined value or at a predetermined range of values. The control means cuts off the electrical current to the relay when the electrical output from the panel 16 is less than that predetermined value or range of values. Alternatively, the control means may cut off the electrical current to the relay when the electrical output from the panel 16 is at or less than another predetermined value or range of values such that there are two critical predetermined values or range of values, one for energizing and one for de-energizing. Since the motor rotates the panel in only one direction which is that in which it tends to attempt to place the panel 16 ahead of the sun's apparent movement, the fall below the predetermined value will occur when the motor 26 has rotated the panel 16 too far such that the sun's subsequent apparent movement will result in the panel becoming closer to the optimal position thereby increasing the energy output from the panel and activating the motor 26 again.

Figure 3:
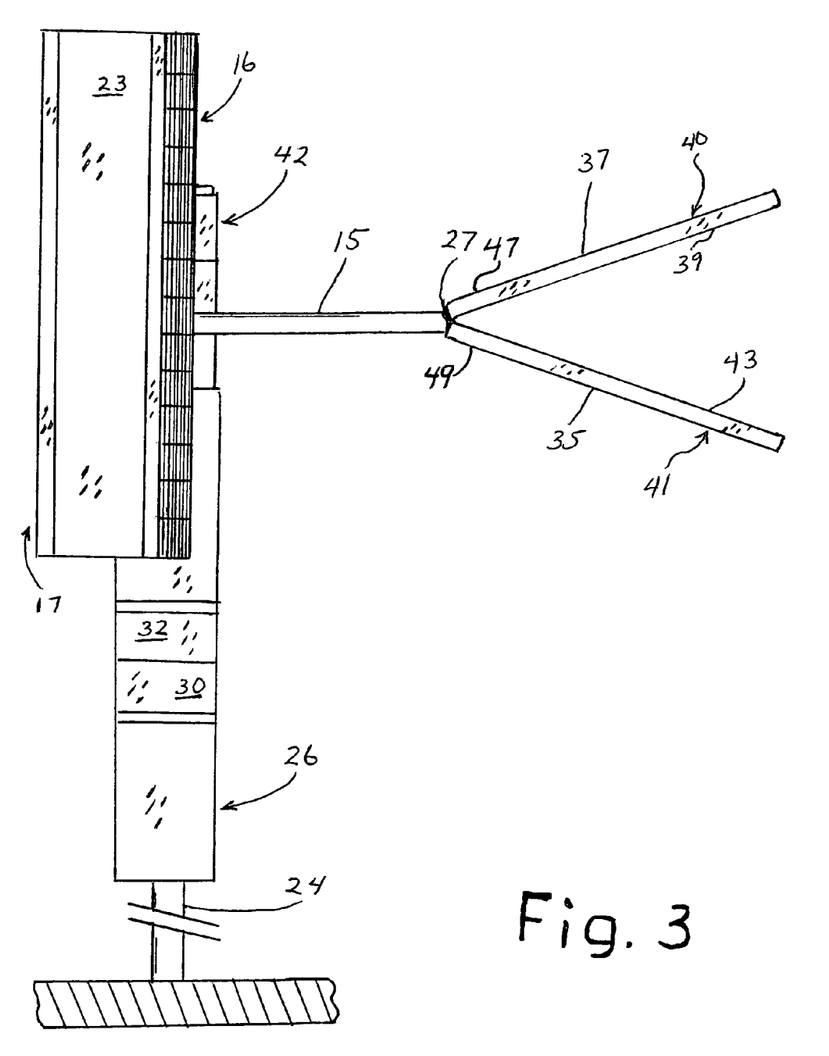
FIG. 3 is a side diagrammatic view of the first embodiment of the solar tracker assembly showing the invention in more detail and also showing the elevation components thereof.
Figure 4:
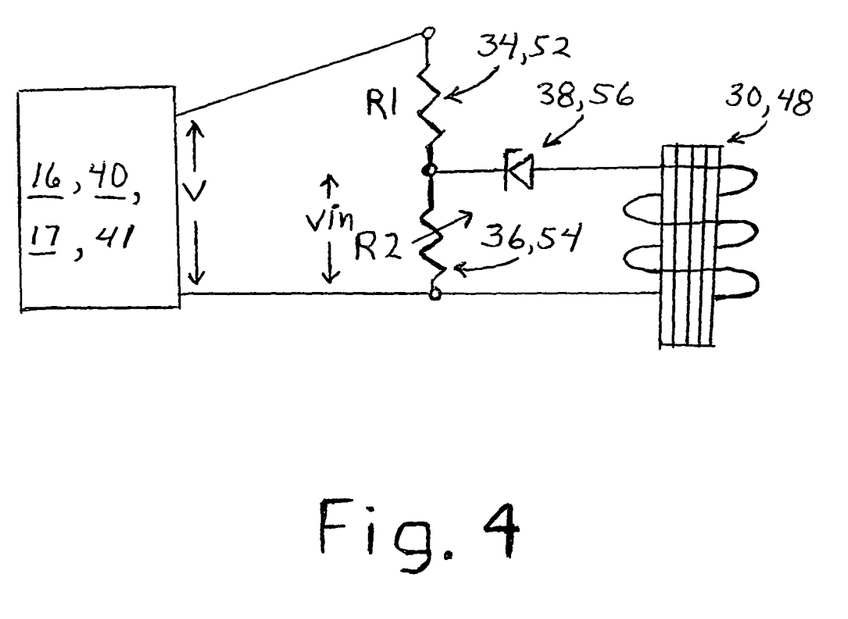
FIG. 4 is a block diagram of the first embodiment of the assembly with a schematic representation of the means for controlling the motor component thereof.

Preferably, the electrical output control means 32 comprises a voltage divider circuit which preferably includes a first resistor 34, a second resistor 36 and a zener diode 38, as shown in FIG. 3. The electrical output voltage V is fed to the two resistors 36 and 38 which are connected in series and schematically shown as R1 and R2. The resistor 36 is preferably variable. The voltage across R2 is $Vin = V \times R2/(R1+R2)$. This voltage is less than the voltage V generated by the solar panel 16. When the output voltage V is large enough, the voltage Vin exceeds the zener diode threshold and the relay is activated so that the motor receives sufficient energy for activation and thereby rotation of the axle and solar panel 16. When the output voltage V drops to the level where Vin drops below the zener diode threshold the current to the relay cuts off and the electrical current to the motor 26 is also cut off so that the motor stops and rotation of the axle and solar panel stops. Upon further movement of the sun and the attendant increase in the voltage V, the zener diode will again conduct tripping the relay and producing motor activation. Setting the value of R2 can be done at the time of construction of the assembly 10 or in the field.

The azimuth angle tracking function provided by solar azimuth panel 16, motor 26 and associated components provides substantial enhancement of the amount of energy the solar panel receives in diurnal periods of operation. However, adjustment for the tilt of the earth on its axis during the year is also desirable to further enhance the solar energy the solar panel receives annually. Elevation angle adjustment is therefore provided by means of elevation adjustment panels (or second pair of panels) 40 and 41 in conjunction with a second motor 42, the second axle 44, a second set of electrical wires 46, a second relay 48 and a second electrical output control means 50. The pair of preferably identical panels 40 and 41 are angularly positioned with respect to each other. The top panel 40 is tilted upward so that it is oriented to receive sunlight during the early (before noon) daylight hours. The lower panel 41 is preferably tilted downward and positioned underneath the top panel 40 so that it is oriented to not receive sunlight during the early daylight hours but is rather in the shadow of the panel 40 during these early daylight hours. Both panels 40 and 41 are connected to the elevation motor 42 via the set of electrical wires 46 (preferably a pair for each panel 40 and 41) but with opposite polarities. From sunrise to solar zenith the top panel 40 energizes the elevation motor 42 to follow the upward rise of the sun. During this time the lower panel is in the shade of the top panel 40. After noon the sun's elevation decreases to the point where the upper panel's active surface goes into the shade and the lower panel's output takes control of the elevation motor until sunset. It is not necessary for both the panels in the elevation pair to have a common physical connection. The upper and lower panels can be located anywhere along axle 44 or any extension of shaft 44 as long as its angular orientation with respect to the rest of the elements of system 10 is maintained. Similarly, the panel 16 can likewise be located anywhere on axle 44 or any extension of axle 44 as long as its angular orientation with respect to the rest of the elements of system 10 is maintained. The second relay 48, as with the first relay 30, has an energizing voltage which is selected to conform to the energy requirements of the second motor 42. The second electrical output control means 50 preferably comprises a pair of second output control means 50 with one of the pair connected to the panel 40 and the other of the pair connected to the panel 41. The second output control means 50 includes a first elevation resistor 52, a second elevation resistor 54 and an elevation zener diode 56. Alternatively, however, since the solar panels can act as electrical diodes when an external current is fed into them, the panels per se may be substituted for the diodes and thus used to pass electrical current in one direction only and thereby eliminating the need for a diode in the output control means. With such an alternative design, the panels would be electrically connected to suitable resistors and not to diodes. The second output control means 50 (and its components) in purpose and function is the same as the first electrical output control means 32. The upper solar panel 40, as with solar panel 16, has a front side or face 37 and a back side 39. The face 37 is designed for reception of solar energy via solar rays 14 incident thereon. The lower solar panel 41 similarly has a front side or face 43 and a back side 35. The face 43 is designed for reception of solar energy via solar rays 14 incident thereon.

In operation, the upper and lower panels 40 and 41 convert solar energy of the solar rays 14 irradiating them (depending on the time of day) to electrical current which one of these panels 40 or 41 feeds to the motor 42 causing the motor 42 to rotate the axle 44 and the panel 40 (as well as the panel 16). The axle 44 can have any convenient orientation and is preferably tangent to the earth's surface. The axle also may be oriented so that it is generally perpendicular to the earth's axis (not shown). The motor 42 is set up and connected to the axle such that it rotates the axle 44 and panels in a north to south as well as a south to north direction depending on which panel is powering it. As the sun's apparent position in the sky rises in the early daylight hours, the upper panel 40 energizes and activates and powers the motor 42 to rotate the axle 44 and panels upwardly in accordance with the sun's apparent upward movement. The motor 42 continues to rotate the axles and panel until it no longer receives sufficient electrical energy from the panel 40 to activate or actuate it (at approximately solar zenith or, more preferably, just past solar zenith). As the sun's apparent position drops after noon, the lower panel 41 comes out of the shadow of panel 42 and provides sufficient electrical energy to power the motor 42. Due to the opposite polarity connection of the panel 41 to the motor 42, the panel 41 powers the motor 42 to rotate the axle 44 and panels down as the sun's apparent position in the sky drops.

Basically, the motor 42 rotates the axle 44 and panels 16 and 40 away from and ahead of the sun's apparent movement relative to the earth (and the assembly 10). The motor 42 and the axle 44 and panels therefore stop with the panel 40 at a position where the angle of incidence of solar radiation irradiating it is less than optimal. This angle of incidence where the panel 40 as well as the power panel 12 are stopped may be slightly less than, or substantially less than, perpendicular depending on the particular requirements of the solar power panel or array 12 or the application for which the tracker assembly 10 is being utilized. This rotation function thus provides elevation angle adjustment or tracking for the panel 40 as well as the power panel 12 and other associated structures. Although the drive means are disclosed as electric motors, other alternative electromechanical means such as, for example, an actuator can also be utilized for rotating the axles 24 and 44.

The first axle 24 may be set so that it is parallel to the earth axis. However, it need not be because the elevation angle adjustment provided by the invention 10 compensates for errors in parallel positioning of the first axle 24 relative to the earth axis. Moreover, the elevation angle adjustment components of the invention 10 allow the first axle 24 to be positioned on the installation site without reference to the earth axis.

Since at sunset the diurnal rotation of the azimuth primary panel 16 positions it so that it is facing away from the sunrise position of the sun, the assembly 10 incorporates an azimuth return panel 17 to reposition the assembly 10 for the succeeding day's operation. Thus, the azimuth primary panel 16 and the azimuth return panel 17 together provide proper azimuth angle adjustment during day after day operation. The first pair of panels (or pair of azimuth adjustment panels) 16 and 17 and the second pair of panels 40 and 41 are rigidly secured to each other at edges 25 and 27 thereof so that they maintain their relative angular position. The edge 25 is preferably approximately parallel to earth axis when in operation and preferably located at the east ends or end portions 31 and 33 thereof and, for panels 40 and 41, the edges 27 are at end portions 47 and 49 thereof. Alternatively, the edge 25 may be other than approximately parallel to earth axis when in operation if the particular application has other angle of incidence requirements.

The first set of electrical wires 28 provides electrical connection from the solar panels 16, 17 to the motor 26 for providing power thereto. The second set of wires 46 is also included for providing electrical connection from the solar panels 40 and 41 to the motor 42 for providing power thereto. The electrical wires 28 and 46 are also flexible to prevent interference with the operation of the axles 24 and 44 as well as associated structures.

The invention 10 has the first pair of panels (or first panels) 16 and 17 as well as the second pair of panels (or second panels) 40 and 41 positioned so that they are at an acute angle relative to each other. That acute angle is a select and specific angle determined by the position of the panels 16 and 40 at sunset and the desired position that the return panel 17 should be placed in at sunrise. The angle may, for example, be twenty-five degrees. The selection of that angle places the azimuth adjustment return panel 17 in position for facing the sun and receiving the solar rays at the optimal angle of incidence (or other desired angle) at sunrise following the end of the diurnal operation of the assembly 10. During one day's operation, the panels 16 and 40 are being irradiated and therefore providing electrical power to the respective motors 26 and 42. As a result of the controlled rotation of the panel pairs and the respective angles of each pair, on the sunrise of the succeeding day the return panel 17 is facing the sun and therefore providing electrical power to the respective motor 26. The azimuth electrical output control means 32 preferably comprises a pair of azimuth electrical output control means 32 (which are structurally identical to each other) one connected to the panel 16 and the other connected to the panel 17 and both connected to the motor 26. Since the panel 17 is wired, via respective pair of the first set of electrical wires 28, with opposite polarity (with reference to the wiring of panel 16) to the motor 26, the panel 17 rotates the motor 26, axle 44 and panels in the opposite direction from that of the preceding day so that the panel 17 rotates the assembly components back to the position of the prior sunrise and thereby at a position to track the sun's apparent movement during that day's operation. Thus, there is no necessity for reset (either manual or by other external means) of the panels at the end of the day's operation. The assembly 10 automatically positions its components for optimal reception of the solar rays at every succeeding sunrise. In addition, the entire installation may be mounted on gimbals or other suitable mechanical structures capable of allowing bidirectional rotation.

Figure 5:
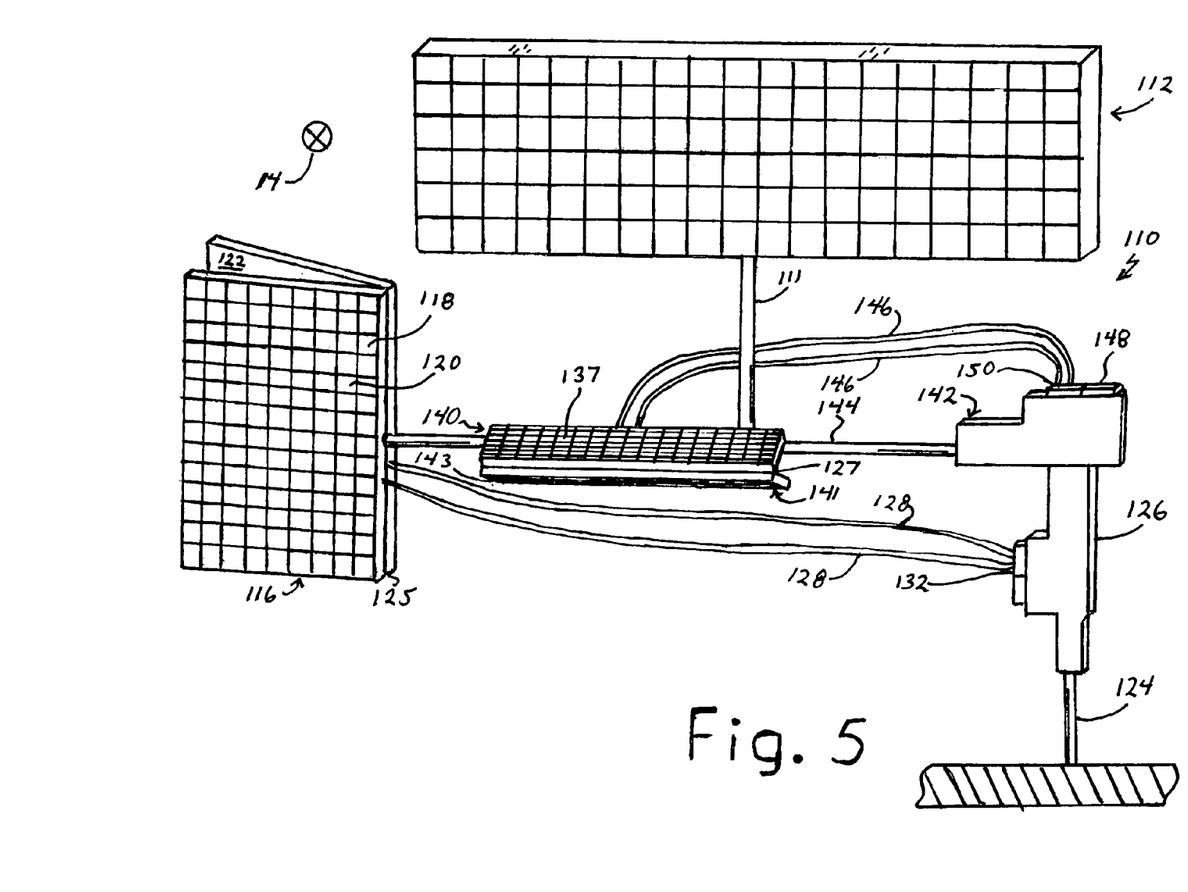
FIG. 5 is a perspective view of the second embodiment of the solar tracker assembly shown connected to a solar array which the assembly is designed to position in accordance with its tracking of the sun's apparent diurnal movement across the sky.
Figure 6:
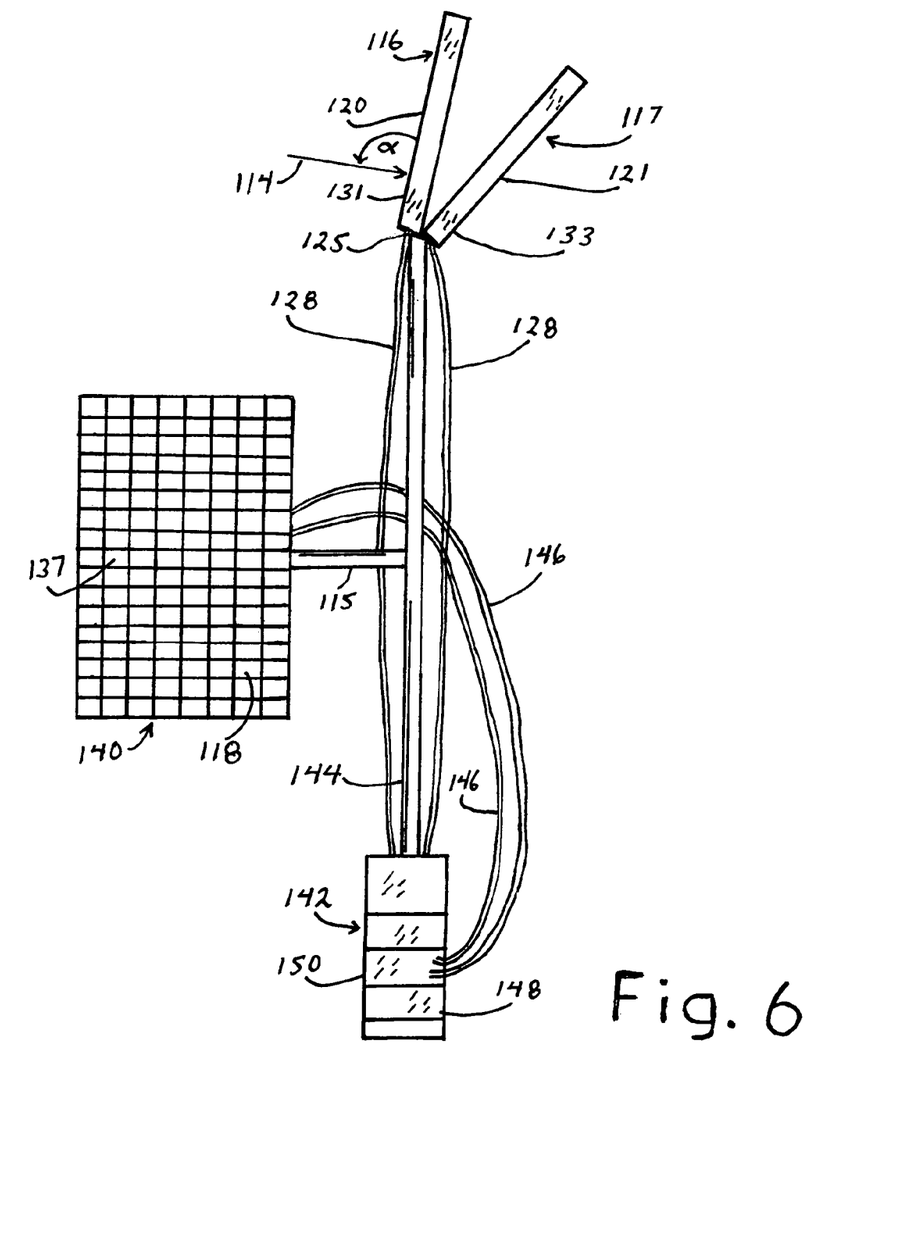
FIG. 6 is a top diagrammatic view of the second embodiment of the solar tracker assembly showing the second embodiment in more detail and also showing the return components thereof.

FIG. 5 shows the second embodiment of the solar tracker assembly of the invention generally designated by the numeral 110. FIGS. 5 and 6 also show the assembly 110 connected to and being used to position a solar power panel array 112 so that the power array 112 is facing the sun throughout the day and so that the solar rays 114 illuminating the solar array 112 are at a desired angle of incidence to provide a desired concentration of solar energy on the solar array 112 and thereby enhance solar ray reception thereof.

As shown in FIGS. 5 and 6, the assembly 110 of the invention includes an azimuth adjustment primary (or first) driver solar panel 116 consisting of a multiplicity of interconnected solar photovoltaic cells 118. As with embodiment 10, the solar panel 116 has a front side or face 120 and a back side 122. The face 120 is designed for reception of solar energy via solar rays 114 incident thereon.

As with embodiment 10, the driver panel 116 is rigidly connected to a second rotatable shaft or axle 144. A first electric motor 126 is rotatably connected to a first base shaft or axle 124 which in turn is rigidly connected to a secure base or foundational structure so that the axle 124 is rigid relative thereto. The motor 126 is electrically connected to the solar panel 116 via first electric wires or first set of electrical wires 128 for providing electric power to the motor 26.

In operation, the driver panel 116 is functionally and structurally identical to driver panel 16 of embodiment 10. Therefore, the description of driver panel 116 and its associated components will not be repeated to promote brevity.

Since the motor 126 as with motor 26 is preferably a conventional electric motor, it characteristically may be able to rotate relative to the axle 124 and rotate the axle 144 and panel 116 throughout a broad range of electrical energy parameters. It is therefore desirable as with motor 26 to narrow the range of voltage or amperage fed into the motor 126 and in this manner accurately control the operation of the motor 126. To accomplish this goal, the assembly 110 incorporates a relay 130 and an azimuth electrical output control means 132. The electrical output control means 132 and relay 130 are structurally and functionally identical to control means 32 and relay 30 of embodiment 10 so their description will not be repeated.

Figure 7:
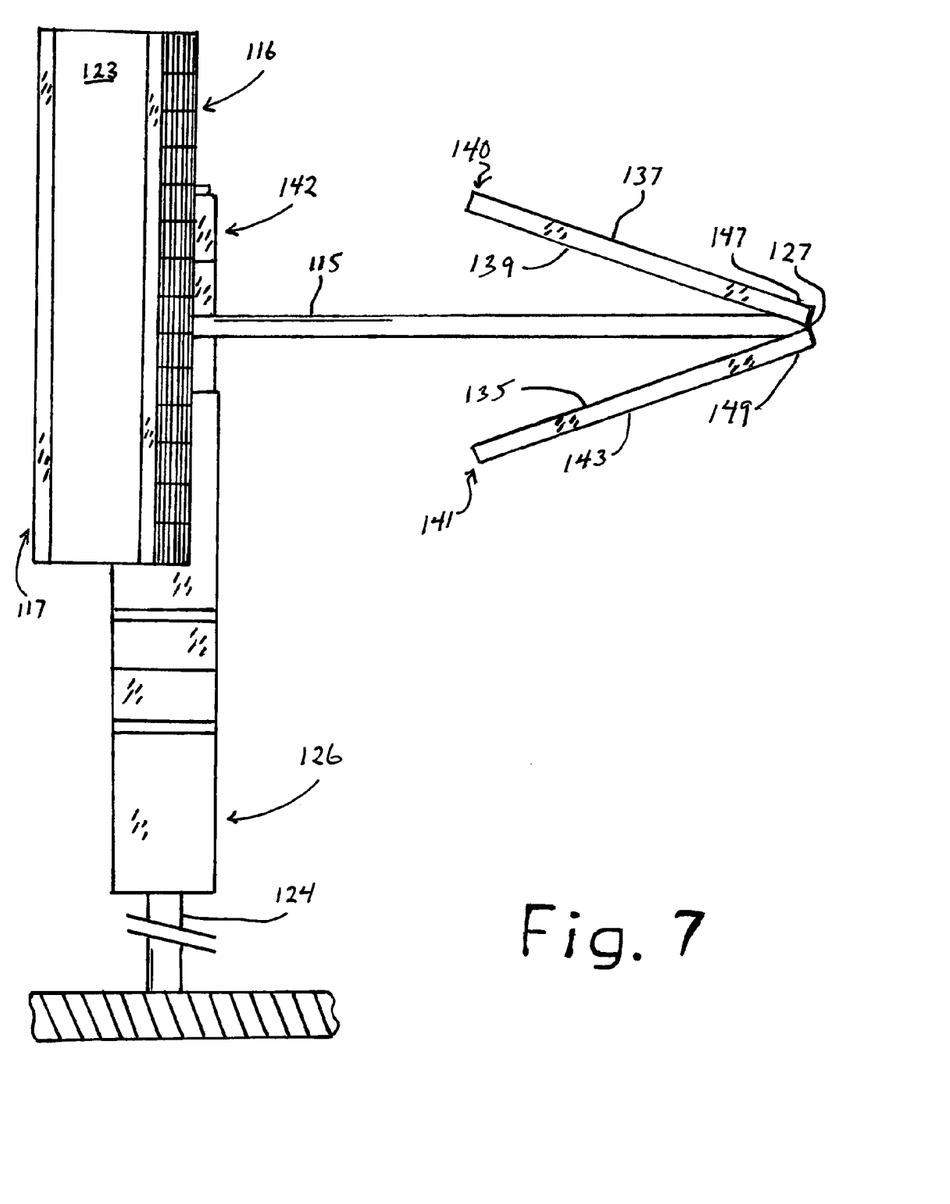
FIG. 7 is a side diagrammatic view of the second embodiment of the solar tracker assembly showing the invention in more detail and also showing the elevation components thereof.
Figure 8:
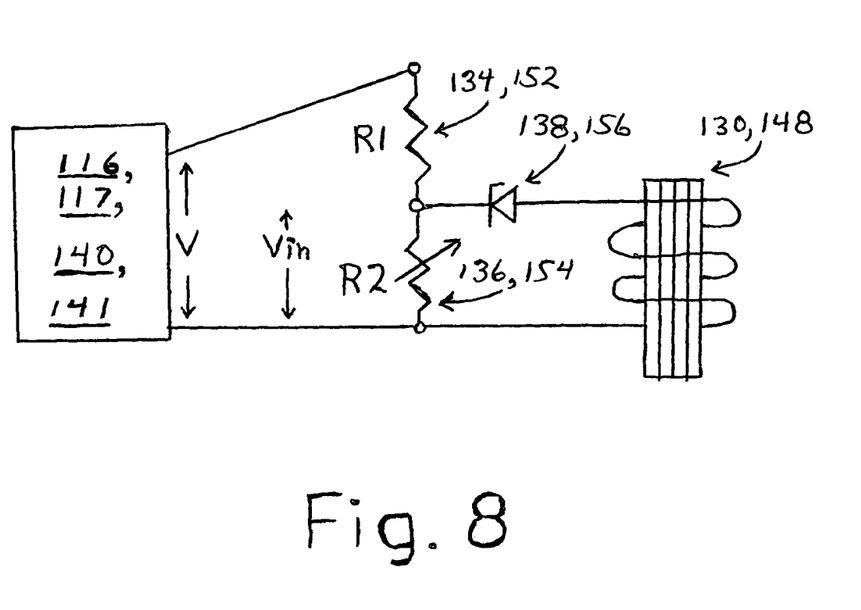
FIG. 8 is a block diagram of the second embodiment of the assembly with a schematic representation of the means for controlling the motor component thereof.

Preferably, the electrical output control means 132 comprises a voltage divider circuit which preferably includes a first resistor 134, a second resistor 36 and a zener diode 138, as shown in FIG. 7. These components function the same as correspondingly numbered components of embodiment 10 so their description will not be repeated.

Elevation angle adjustment is provided by means of elevation adjustment (or a pair of second) solar panels 140 and 141 in conjunction with a second motor 142, the second axle 144, a second set of electrical wires 146, a second relay 148 and a second electrical output control means 150. The elevation angle adjustment components of embodiment 110 are generally the same as those of embodiment 10. Similar to embodiment 10, the pair of preferably identical panels 140 and 141 are angularly positioned with respect to each other. However, these components are different from those correspondingly numbered components of embodiment 10 in that the panels 40 and 41 of embodiment 10 are oriented so that they are angled outwardly relative to the axle 44 whereas the panels 140 and 141 are oriented so that they are angled inwardly relative to the axle 144. The top panel 140 is similarly tilted upward, but in an opposite direction from panel 40, so that it is oriented to receive sunlight during the early (before noon) daylight hours. The lower panel 41 is preferably similarly tilted downward, but in an opposite direction from panel 41. As with embodiment 10, panel 141 is positioned underneath the top panel 140 so that it is oriented to not receive sunlight during the early daylight hours but is rather in the shadow of the panel 140 during these early daylight hours. As with embodiment 10, both panels 140 and 141 are connected to the elevation motor 142 via the set of electrical wires 146 (preferably a pair for each panel 140 and 141) but with opposite polarities. As with embodiment 10, from sunrise to solar zenith the top panel 140 energizes the elevation motor 142 to follow the upward rise of the sun. During this time the lower panel is in the shade of the top panel 140. After noon the sun's elevation decreases to the point where the upper panel's active surface goes into the shade and the lower panel's output takes control of the elevation motor until sunset. It is not necessary for both the panels in the elevation pair to have a common physical connection. The upper and lower panels can be located anywhere along axle 144 or any extension of shaft 144 as long as its angular orientation with respect to the rest of the elements of system 110 is maintained. Similarly, the panel 116 can likewise be located anywhere on axle 144 or any extension of axle 144 as long as its angular orientation with respect to the rest of the elements of system 110 is maintained. The second relay 148, as with the first relay 130, has an energizing voltage which is selected to conform to the energy requirements of the second motor 142. The second output control means 150 preferably comprises a pair of second output control means (each of which is structurally identical to the other) 150 with one of the pair connected to the panel 140 and the other of the pair connected to the panel 141. The second output control means 150 includes a first elevation resistor 152, a second elevation resistor 154 and an elevation zener diode 156. The second output control means 150 (and its components) in purpose and function is the same as the first electrical output control means 132. The upper solar panel 140, as with solar panel 116, has a front side or face 137 for receiving solar radiation and a back side 139. The lower solar panel 141 similarly has a front side or face 143 and a back side 135. Unlike panels 40 and 41 of the first embodiment, the sides 139 and 135 are positioned so that they are facing inwardly generally toward each other. The face 143 is designed for reception of solar energy via solar rays 114 incident thereon. The faces 137 and 143 are oppositely positioned such that they face outwardly and generally away from each other. Although the drive means are disclosed as electric motors, other alternative electromechanical means can be utilized for rotating the axles 124 and 144.

The operation and function of the upper and lower panels 140 and 141 are the same as of upper and lower panels 40 and 41 of embodiment 10. Therefore, the description thereof will not be repeated to promote brevity.

The first axle 124 may be set so that it is parallel to the earth axis. However, it need not be because the elevation angle adjustment provided by the invention 110 as with embodiment 10 compensates for errors in parallel positioning of the first axle 124 relative to the earth axis.

As with embodiment 10, embodiment 110 also includes an azimuth adjustment return panel 117 which functions in conjunction with panel 116. The first pair of panels 116 and 117 and the second pair of panels 140 and 141 are rigidly secured to each other at edges 125 and 127 thereof so that they maintain their relative angular position. The edge 125 is preferably approximately parallel to earth axis when in operation and preferably located at the east ends or end portions 131 and 133 thereof and, for panels 140 and 141, the edges 127 are at end portions 147 and 149 thereof. Alternatively, the edge 125 may be other than approximately parallel to earth axis when in operation if the particular application has other angle of incidence requirements.

The first set of electrical wires 128 provides electrical connection from the solar panels 116, 117 to the motor 126 for providing power thereto. The second set of wires 146 is also included for providing electrical connection from the solar panels 140 and 141 to the motor 142 for providing power thereto. The electrical wires 128 and 146 are also flexible to prevent interference with the operation of the axles 124 and 144 as well as associated structures.

As with embodiment 10, the invention 110 has the pair of panels 116 and 117 as well as 140 and 141 positioned so that each pair are at an acute angle relative to each other. That acute angle is a select and specific angle determined by the position of the panels 116 and 140 at sunset and the desired position that the return panel 117 should be placed in at sunrise. The angle may, for example, be twenty-five degrees. The selection of that angle places the return panel 117 in position for facing the sun and receiving the solar rays at the optimal angle of incidence (or other desired angle) at sunrise following the end of the diurnal operation of the assembly 110. During one day's operation, the panels 116 and 140 are being irradiated and therefore providing electrical power to the respective motors 126 and 142. As a result of the controlled rotation of the panel pairs and the respective angles of each pair, on the sunrise of the succeeding day the return panel 117 is facing the sun and therefore providing electrical power to the respective motor 126. The azimuth electrical output control means 132 preferably comprises a pair of azimuth electrical output control means 132 one connected to the panel 116 and the other connected to the panel 117 and both connected to the motor 126. Since the panel 117 is wired, via respective pair of the first set of electrical wires 128, with opposite polarity (with reference to the wiring of panel 116) to the motor 26, the panel 117 rotates the motor 126, axle 144 and panels in the opposite direction from that of the preceding day so that the panel 117 rotates the assembly components back to the position of the prior sunrise and thereby at a position to track the sun's apparent movement during that day's operation. Thus, there is no necessity for reset (either manual or by other external means) of the panels at the end of the day's operation. In both embodiments 10 and 110, the assembly (10 and 110) automatically positions its components for optimal reception of the solar rays at every succeeding sunrise. In addition, the entire installation may be mounted on gimbals or other suitable mechanical structures capable of allowing bidirectional rotation.

Accordingly, there has been provided, in accordance with the invention, an assembly which provides solar tracking and azimuth angle as well as elevation angle adjustment for enhanced annual tracking efficiency and which provides daily automatic solar tracking throughout annual usage thereof and thus fully satisfies the objectives set forth above. It is to be understood that all terms used herein are descriptive rather than limiting. Although the invention has been specifically described with regard to the specific embodiment set forth herein, many alternative embodiments, modifications and variations will be apparent to those skilled in the art in light of the disclosure set forth herein. Accordingly, it is intended to include all such alternatives, embodiments, modifications and variations that fall within the spirit and scope of the invention as set forth in the claims hereinbelow.

The invention claimed is:

1. A solar tracker assembly, comprising:
a solar driver panel including a set of interconnected solar photovoltaic cells;
an axle, said solar panel mounted on said axle, said axle oriented to position said solar panel for receiving rays from the sun throughout diurnal operation of the assembly;
an electric motor rotatably connected to said axle for rotational movement between said electric motor and said axle to enable rotational movement of said solar panel on said axle corresponding to movement of the earth relative to the sun to optimize positioning of said solar panel relative to the sun to enhance solar ray reception of said solar panel throughout the day;
means for controlling electrical output from said solar panel to control solar panel output fed into said electric motor, said means for controlling electrically connected to said electric motor for only operational control thereof, said means for controlling consisting of only electronic components so that it receives only electrical input and provides only electrical output without including physical structures defining apertures used to locate solar panels relative to the sun; wherein said means for controlling electrical output selectively controls the output voltage from said solar panel in order to control operation of said motor and thereby control rotation of said solar panel in order that said solar panel maintains a desired angular orientation relative to direction of propagation of the solar rays throughout diurnal operation of the assembly; wherein said means for controlling includes a voltage divider circuit receiving electrical output from said solar panel, said voltage divider circuit providing an electrical output responsive to said solar panel electrical output and selected according to electrical power requirement of said motor for operational control of said motor; wherein said voltage divider circuit includes a first resistor, a second resistor and a zener diode, said first resistor and said second resistor electrically connected together in series, said zener diode electrically connected to said first resistor and between said first resistor and said second resistor so that said zener diode taps into current flowing between first and second resistor, said second resistor being variable in order to control its resistance so that flow of electrical current through said zener diode is dependent on the resistance of the second resistor;
electrical wires directly interconnecting only said solar panel, said means for controlling and said electric motor to provide electrical power produced by said solar panel to said means for controlling and to said electric motor, said solar panel providing sufficient voltage and amperage to drive said electric motor without requiring introduction of electrical power from generating or capacitive devices needed to drive said electric motor;
a solar array rigidly mounted on said axle for rotational movement thereof relative to said motor.

2. The solar tracker assembly of claim 1 wherein said panel includes a first panel and said axle includes a first axle which is oriented to enable azimuth rotation of said solar panel.

3. The solar tracker assembly of claim 2 wherein said panel includes a second panel and said axle includes a second axle which is orthogonal to said first axle to enable elevation rotation of said second axle and said second solar panel.

4. The solar tracker assembly of claim 1 further including a relay electrically connected to said means for controlling electrical output and electrically connected to said motor for control thereof, said relay having an energizing voltage selected so that said motor is turned on and off according to orientation of said solar panel relative to solar rays and according to a degree of solar energy received by said solar panel from the solar rays.

5. The solar tracker assembly of claim 4 wherein said voltage divider circuit is connected to said relay and provides an electrical output to said relay responsive to said solar panel electrical output and selected according to electrical power requirement of said motor for operational control of said motor.

6. The solar tracker assembly of claim 5 wherein said second resistor is variable in order to control its resistance relative to that of said relay so electrical current will not flow through said zener diode into said relay when said second resistor is adjusted so that its resistance is sufficiently low relative to that of said relay in order to control electrical output going into said zener diode and thereby control output of said zener diode, said zener diode having a threshold voltage parameter selected so that the threshold voltage is matched to an electrical power requirement of said motor for operational control thereof.

7. The solar tracker assembly of claim 1 wherein said solar panel includes a pair of solar panels mounted on said axle, said pair of solar panels positioned so that faces thereof are oriented facing an outward direction relative to the assembly and facing the sun during diurnal operation thereof, said faces oriented so that forming an acute angle relative to each other from vantage point of the sun during diurnal operation thereof.

8. The solar tracker assembly of claim 7 wherein said pair of solar panels are interconnected at an edge of each of said pair of solar panels so that said each of said pair of solar panels are oriented at the acute angle relative to each other, the edge of each of said pair of solar panels is perpendicular to the sun's rays and perpendicular to or parallel to earth axis at midday during diurnal operation thereof, the edge of each of said pair of solar panels located so that vertex of the acute angle is in the edge, said each of said pair of solar panels positioned so that faces thereof designed to receive solar rays are facing each other.

9. The solar tracker assembly of claim 7 wherein said pair of solar panels includes a first pair and a second pair of solar panels and wherein said axle includes a first axle and a second axle, said first pair of solar panels directly mounted on said second axle and in physical contact therewith, said first pair of solar panels rigidly secured to said second axle and absent intermediate physical structures therebetween so that rotation of said second axle produces concomitant rotation of said first pair of solar panels in order to provide precise rotational control thereof, and said second pair of solar panels mounted on said second axle, said first axle oriented to enable rotational movement of said first pair of solar panels relative to said first axle to allow adjustment of azimuth angle orientation with reference to earth spherical coordinates of said pair of solar panels to provide position adjustment of said first pair of solar panels to correspond to rotational movement of the earth relative to the sun in order to accommodate diurnal movement of the earth relative to the sun, said second axle oriented generally orthogonal to said first axle to enable rotational movement of said second pair of solar panels on said second axle to allow adjustment of elevation angle orientation with reference to earth spherical coordinates of said second pair of solar panels to provide position adjustment of said second pair of solar panels to correspond to tilt movement of the earth relative to the sun to adjust elevation positioning of the assembly in order to accommodate seasonal movement of the earth relative to the sun.

10. The solar tracker assembly of claim 9 wherein said second pair of solar panels is positioned so that faces thereof designed to receive solar rays are facing an outward direction relative to the assembly and facing the sun during diurnal operation thereof, said faces oriented so that forming an obtuse angle relative to each other from vantage point of the sun during diurnal operation thereof.

11. The solar tracker assembly of claim 9 wherein said first pair of panels are interconnected at edges of each of said pair such that the edges are in full physical contact with each other, the edges parallel to earth axis and perpendicular to sun's rays during diurnal operation of the assembly, the edges distally located relative to said first axle and said second axle, the edges of said first pair of solar panels are oriented so that they are generally parallel to the first axle, the acute angle selected so that at sunset said motor stops rotation of said first axle and said first pair of panels at a position resulting in positioning of opposite face of said first pair of solar panels facing solar rays of sunrise via rotational movement of said first pair of solar panels on said first axle.

12. A solar tracker assembly, comprising:
a first solar panel including a set of interconnected solar photovoltaic cells;
a second solar panel including a set of interconnected solar photovoltaic cells;
a first axle;
a second axle orthogonal to said first axle, said first solar panel rigidly mounted directly on said second axle such that said first solar panel is in physical contact with said second axle, said second solar panel rigidly mounted on said second axle, said second axle oriented to position said second solar panel for receiving rays from the sun throughout diurnal operation of the assembly;
a first electric motor rotatably connected to said first axle for rotational movement of said first electric motor relative to said first axle to enable azimuth rotational movement of said first solar panel on said first motor and relative to said first axle corresponding to rotational movement of the earth relative to the sun to optimize positioning of said first solar panel relative to the sun to enhance solar ray reception of said first solar panel throughout the day;
a first set of electrical wires interconnecting said first solar panel and said first electric motor to provide electrical power produced by said first solar panel to said first electric motor;
a second electric motor rotatably connected to said second axle for rotational movement of said second axle relative thereto to enable elevation rotational movement of said second solar panel on said second axle corresponding to axis tilt movement of the earth relative to the sun to optimize positioning of said second solar panel relative to the sun to enhance solar ray reception of said second solar panel throughout the day;
a second set of electrical wires interconnecting said second panel and said second electric motor to provide electrical power produced by said second solar panel to said second electric motor; the solar tracker assembly further including a first and second means for selectively controlling an output voltage from said first solar panel and said second solar panel, respectively, in order to control operation of said first and second motor and thereby control rotation of said first solar panel and said second solar panel in order that said first solar panel and said second solar panel maintain a desired angular orientation relative to direction of propagation of solar rays throughout diurnal operation of the assembly; wherein said first and second means for controlling the output voltage includes a first and second voltage divider circuit receiving electrical output from said first solar panel and said second solar panel, respectively, said first and second voltage divider circuit providing an electrical output responsive to said first and second solar panel electrical output and selected according to an electrical power requirement of said first motor and said second motor, respectively, for operational control of said first and second motor; wherein said first voltage divider circuit includes a first resistor, a second resistor and a zener diode, said first resistor and said second resistor electrically connected together in series, said zener diode electrically connected to said first resistor and between said first resistor and said second resistor so that said zener diode taps into current flowing between first and second resistor, said second resistor being variable in order to control its resistance so that flow of electrical current through said zener diode is dependent on the resistance of the second resistor.

13. The solar tracker assembly of claim 12 further including a first and second relay electrically connected to said first and second motor, respectively, for control thereof, and wherein said first and second means for selectively controlling controls the output voltage from said first solar panel and said second solar panel, respectively, feeding into said first and second relay, respectively, said first and second relay having an energizing voltage selected so that said first motor and said second motor are turned on and off according to orientation of said respective solar panel relative to solar rays and according to degree of solar energy received by said respective solar panel from the solar rays.

14. The solar tracker assembly of claim 13 wherein said first and second voltage divider circuit are connected to said first and second relay, respectively, and provide an electrical output to said first and second relay responsive to said first and second solar panel electrical output and selected according to electrical power requirement of said first motor and said second motor, respectively, for operational control of said first motor and said second motor.

15. The solar tracker assembly of claim 14 wherein said second resistor is variable in order to control its resistance relative to that of said relay so electrical current will not flow through said zener diode into said relay when said second resistor is adjusted so that its resistance is sufficiently low relative to that of said relay in order to control electrical output going into said zener diode and thereby control output of said zener diode.

16. The solar tracker assembly of claim 12 further including a first solar array and a second solar array rigidly mounted respectively on said first axle and said second axle for rotational motor thereof relative to said first motor and said second motor, respectively.

17. The solar tracker assembly of claim 12 wherein said first solar panel includes a first pair of solar panels mounted at any desired location on said second axle, said first pair of solar panels positioned so that faces thereof are oriented facing an outward direction relative to the assembly and facing the sun during diurnal operation thereof, said faces oriented so that forming an acute angle relative to each other from vantage point of the sun during diurnal operation thereof, said each of said first pair of solar panels positioned so that faces thereof designed to receive solar rays are facing each other.

18. The solar tracker assembly of claim 12 wherein said first solar panel includes a first pair of solar panels interconnected at an edge of each of said pair of solar panels are oriented at an acute angle relative to each other, the edge of each of said pair of solar panels is perpendicular to the sun's rays and perpendicular to or parallel to earth axis at midday during diurnal operation thereof, the edge of each of said pair of solar panels located so that vertex of the acute angle is in the edge, said each of said pair of solar panels positioned so that faces thereof designed to receive solar rays are facing each other.

19. The solar tracker assembly of claim 18 wherein said first pair of solar panels are rigidly mounted on said second axle and in physical contact therewith, said first pair of solar panels rigidly secured to said second axle and absent intermediate physical structures therebetween so that rotation of said second axle produces concomitant rotation of said first pair of solar panels in order to have precise rotational control thereof, and said second pair of solar panels are rigidly mounted on said second axle, said first axle oriented to enable rotational movement of said first pair of solar panels relative to said first axle to allow adjustment of azimuth angle orientation with reference to earth spherical coordinates of said pair of solar panels to provide position adjustment of said first pair of solar panels to correspond to rotational movement of the earth relative to the sun in order to accommodate diurnal movement of the earth relative to the sun, said second axle oriented generally orthogonal to said first axle to enable rotational movement of said second pair of solar panels on said second axle to allow adjustment of elevation angle orientation with reference to earth spherical coordinates of said second pair of solar panels to provide position adjustment of said second pair of solar panels to correspond to tilt movement of the earth relative to the sun to adjust elevation positioning of the assembly in order to accommodate seasonal movement of the earth relative to the sun.

20. The solar tracker assembly of claim 19 wherein said first pair of panels are interconnected at edges of each of said pair such that the edges are in full physical contact with each other, the edges parallel to earth axis and perpendicular to sun's rays during diurnal operation of the assembly, the edges distally located relative to said first axle and said second axle, the edges of said first pair of solar panels are oriented so that they are generally parallel to the first axle, the acute angle selected so that at sunset said motor stops rotation of said first axle and said first pair of panels at a position resulting in positioning of opposite face of said first pair of solar panels facing solar rays of sunrise via rotational movement of said first pair of solar panels on said first axle.

* * * * *